(12) United States Patent
O'Neil

(10) Patent No.: US 7,707,105 B2
(45) Date of Patent: Apr. 27, 2010

(54) AUTHORIZING FINANCIAL TRANSACTIONS

(75) Inventor: Kevin A. O'Neil, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 352 days.

(21) Appl. No.: 10/299,142

(22) Filed: Nov. 19, 2002

(65) Prior Publication Data
US 2003/0105711 A1 Jun. 5, 2003

(30) Foreign Application Priority Data
Nov. 30, 2001 (CA) .................................... 2364142

(51) Int. Cl.
*G06Q 40/00* (2006.01)
(52) U.S. Cl. .............................. 705/39; 705/35; 705/41
(58) Field of Classification Search .................... 705/35, 705/38–40, 41
See application file for complete search history.

(56) References Cited
U.S. PATENT DOCUMENTS

| | | | |
|---|---|---|---|
| 6,226,624 B1 * | 5/2001 | Watson et al. .................. | 705/44 |
| 6,839,692 B2 * | 1/2005 | Carrott et al. .................. | 705/64 |
| 2001/0034720 A1 * | 10/2001 | Armes .......................... | 705/65 |
| 2001/0047336 A1 * | 11/2001 | Maycock et al. .............. | 705/44 |
| 2001/0051917 A1 * | 12/2001 | Bissonette et al. ............ | 705/39 |
| 2002/0010612 A1 * | 1/2002 | Smith et al. ..................... | 705/8 |
| 2004/0210449 A1 * | 10/2004 | Breck et al. ................... | 705/35 |

FOREIGN PATENT DOCUMENTS
WO  WO9966436  * 12/1999

OTHER PUBLICATIONS

U.S. Appl. No. 60/187,620, filed Mar. 7, 2000.*
FELITEC: Take control of your finances with "Account Express" M2 Presswire. Coventry: Jan 18, 2000. p. 1.*
Purchasing cards: the next generation Brooker, Dena. Modern Purchasing. Toronto: Jun. 1997. vol. 39, Iss. 6; p. 18.*
Visa Buxx Website, "http://www.visabuxx.com/faq/index.cfm", pp. 1-6, copyright 2004, Visa U.S.A. Inc.
Allowcard Website, "http://www.allowcard.com/35controls.asp", p. 1, copyright 2004, Allow Card of America, Inc.

(Continued)

*Primary Examiner*—Lalita M Hamilton
(74) *Attorney, Agent, or Firm*—John R. Pivnichney; Greenblum & Bernstein P.L.C.

(57) ABSTRACT

An account associated with a card is characterized by one or more budgetary items (collectively contained within a budget) that may be created by the card holder, account holder or a third party. A budgetary item may be created based on a time period regardless of the funds presently in the account. A budgetary item may be categorized by function, item or merchant. For example, a budgetary item may be created for "household supplies", "shoes" or "The Gap". The budget may be stored by the card itself, a financial institution or by a third party. When a purchase is being made, a transaction is initiated between the merchant/supplier of the goods or services and the account holder similar to conventional transactions. The budgetary items are used to determine, in part, whether a proposed financial transaction is to be authorized, in whole or in part, or rejected, in whole or in part.

18 Claims, 9 Drawing Sheets

OTHER PUBLICATIONS

Allowcard Website, "http://www.allowcard.com/faq.asp", pp. 1-9, no copyright date.

CIBC CreditSmart Website, "http://www.cibc.com/ca/visa/cibc-creditsmart/smart-management.html", pp. 1-2, copyright 2007, Canadian Imperial Bank of Commerce.

Cybersoft Technologies "Parent Online" Website, "http://www.cybersoftech.com/POL.html", pp. 1-3, copyright 2005, Cybersoft Technologies.

Cybersoft Technologies "Point of Service" Website, "http://www.cybersoftech.com/POSDetails.html#Features", pp. 1-2, copyright 2005, Cybersoft Technologies.

* cited by examiner

AUTHORIZING FINANCIAL TRANSACTIONS

FIELD OF THE INVENTION

The present invention relates generally to financial transactions and, more particularly to authorization of, and restriction of, financial transactions.

BACKGROUND OF THE INVENTION

A significant number of financial transactions occur without the use or exchange of physical currency between transacting parties. Many of these transactions occur using credit cards, smart cards, debit cards and the like (hereinafter collectively referred to as "cards"). Each card is typically associated with one or more accounts which indicate the amount of funds which are available. For example, a credit card is typically associated with an express or variable credit limit (with the variable credit limit often determined by a complex algorithm based on a person's financial resources, recent purchasing habits, and the value of the purchase being transacted). A smart card is associated with an amount of funds stored electronically by the card itself. A debit card may be associated with a person's chequing, savings, money market or other financial account held by a financial institution (e.g., a bank, a brokerage or financial services company, etc.)

Cards have become extremely popular and are increasing in their popularity. Visa International, based on May, 2001 statistics, reports that there is nearly US$3.4 trillion dollars per year in expenditures, worldwide, using credit and debit cards and this level expenditure is increasing at a rate in excess of 20% per year. Visa International, and its member institutions, have issued in excess of one billion Visa credit cards.

However, the ubiquity of use of these cards and the ease which many people acquire one or usually multiple cards, sometimes results in financial difficulties for some people.

Additionally, many people have difficulties in budgeting and ensuring that any income is allocated appropriately. For example, many people create a budget for future spending but have difficulties in ensuring that the actual expenditures follow planned expenditures. Additionally, some government or non-governmental agencies provide assistance through various programs (e.g., food stamps, child assistance programs, food programs, assistance for utilities, etc.) and wish to ensure that their clientele are using the assistance as designed. Other persons (e.g., family members, universities, governments, etc.) provide assistance to students and wish to ensure that the assistance is also used appropriately (i.e., for food, texts, tuition rather than being used for travel, entertainment, etc.).

Attempts have been made to assist card users in managing their finances. For example, some card issuing companies issue an end of year statement breaking down a year's worth of expenditure into various expense categories (e.g., travel expenses, etc.). Other attempts have been made to allow cards to be issued to a family member of the card holder (typically a child) with a reduced monthly spending limit. However, these attempts at assistance, while having some benefit to the card holders, fall short of the assistance desired or required.

Finally, there are many members of society that are unable to gain access to a card due to a person's current or previous financial situation. This may cause significant hardship in gaining access to certain services (e.g., rental of property such as cars, video tapes, etc.) or in embarrassment in using some of the other forms of social assistance (e.g., welfare cheques, food stamps, etc.)

Accordingly, improvements to the shortcomings described above relating to authorization for, and restriction of, financial transactions is desired.

SUMMARY OF THE INVENTION

The present invention is directed to authorization for, and restriction of, financial transactions which address, at least in part, some of the various shortcomings described above.

An account associated with a card is characterized by one or more budgetary items (collectively contained within a budget) that may be created by the card holder, account holder or a third party (e.g., depositor of funds into the account). A budgetary item may be created based on a time period (e.g., monthly, weekly, yearly, etc.) regardless of the funds presently in the account. A budgetary item may be categorized by function (e.g., a category of expenditures), item or merchant. For example, a budgetary item may be created for "household supplies", "shoes" or "The Gap". The budget may be stored by the card itself, a financial institution or by a third party (e.g., the card issuer, the card holder's personal financial software, etc.).

When a purchase is being made, a transaction is initiated between the merchant/supplier of the goods or services and the account holder (e.g., the smart card, the card issuer, financial institution, etc.) similar to conventional transactions.

In a conventional transaction for a credit card, the merchant provides the account holder with the merchant's merchant ID, the card number, the card expiry number, the amount or value of the proposed transaction. This conventional transaction data is then used by the account holder to decide either to authorize or to reject the proposed transaction. In a conventional transaction, the account holder usually bases the decision on the amount of funds available in the account and whether these available funds are sufficient to cover the amount of the proposed transaction. Other factors may also be used by the account holder in determining whether to authorize the proposed transaction such as, for example, the geographic location of the purchase, the reputation of the merchant to deal in fraudulent or stolen cards, pattern of earlier card use as well as many other factors can be used to provide enhanced security to the card and account holders. The transaction may be performed electronically, or through Interactive Voice Response (IVR) systems via a telephone, or with personnel of the merchant and the account holder.

In one embodiment of the present invention, a merchant provides purchase detail data in addition to the conventional transaction data (collectively and in combination, "enhanced transaction data"). The purchase detail data information describes the transaction in greater detail than the conventional transaction data. This purchase detail data may include, for example, the category of the item(s) being purchased (or rented, leased, etc.) by the card holder (e.g., clothes, groceries, dining, entertainment, etc.) or data describing the item(s) themselves (e.g., pants, potato chips, food and drink, movie tickets, etc.). Alternatively, the purchase detail data may be retrieved or generated from the records maintained by the account holder based on the merchant's identification (e.g., determining that items falling into the "clothes" budget category are purchased from "The Gap", "groceries" are purchased from "A&P" or "Kroger", "dining/meals" are purchased from "Pizza Hut" and "entertainment" is purchased from Loews/Cineplex movie theatres, etc.). Upon receipt and/or retrieval of the transaction data (either conventional transaction data or enhanced transaction data), the account holder retrieves the card holder's budget and based on the budget and perhaps factors used in conventional transactions, a proposed transaction is authorized, rejected in full, and in some embodiments, authorized in part and rejected in part. If a proposed transaction is authorized in full or in part, the account holder modifies (or issues instructions to modify) the card holder's budgetary items in view of the authorized transaction.

In some embodiments of the present invention a card holder may be given an opportunity to override some or all of the elements of a proposed transaction which were rejected based on a budgetary restriction placed on the account by the card holder.

In accordance with an aspect of the present invention there is provided a method for authorizing or rejecting a financial transaction using a card, said card associated with an account, said financial transaction between a merchant and a card holder holding said card, said method comprising: if a budgetary item of a budget associated with said card restricts use of funds in said account for a budget category into which said financial transaction appertains: authorizing said financial transaction if funds available for said budgetary item are sufficient to cover said financial transaction; and rejecting said financial transaction if funds available for said budgetary item are insufficient to cover said financial transaction. In accordance with another aspect of the present invention there is provided a computer readable media containing data and instructions which, when executed, adapt a computer system to perform this method.

In accordance with another aspect of the present invention there is provided a method for authorizing a financial transaction using a card, said card associated with an account having a sum of funds available, said method comprising: determining funds available for a budgetary item associated with said card if said financial transaction appertains to said budgetary item; if both said funds available for said budgetary item and said sum of funds available are sufficient to satisfy the value of said financial transaction, authorizing said financial transaction. In accordance with another aspect of the present invention there is provided a computer readable media containing data and instructions which, when executed, adapt a computer system to perform this method.

In accordance with still another aspect of the present invention there is provided a method for enforcing a budget on the use of a card for a financial transaction, said card associated with an account maintained by an account holder, said account comprising a balance describing funds available in said account, said method comprising: storing a budget comprising a budgetary item, said budgetary item associating a category with a sum of funds available for purchases appertaining to said category; requesting that said account holder use said budget when determining whether to authorize a financial transaction using said card; and requesting said account holder for authorization for said financial transaction.

In accordance with still another aspect of the present invention there is provided a method for authorization of a financial transaction involving the use of a card, said method comprising: transmitting a request to an account holder maintaining an account associated with said card describing: the value of said financial transaction, said card and a plurality of items included in said financial transaction, each of said plurality of items comprising one of a good and a service; and receiving authorization or rejection for each of said plurality of items included in said financial transaction. In accordance with another aspect of the present invention there is provided a computer readable media containing data and instructions which, when executed, adapt a computer system to perform this method.

In accordance with still another aspect of the present invention there is provided a computer readable media containing data and instructions which, when executed, adapt a computer system to: determine if a budgetary item of a budget associated with a card restricts use of funds in an account for a budget category into which a financial transaction is categorized; if determined that a budgetary item of a budget associated with a card restricts use of funds in an account for a budget category into which a financial transaction is categorized: authorize said financial transaction if funds available for said budgetary item are sufficient to cover said financial transaction; and reject said financial transaction if funds available for said budgetary item are insufficient to cover said financial transaction.

In accordance with still another aspect of the present invention there is provided a computer readable media containing data and instructions which, when executed, adapt a computer system to authorize or reject a financial transaction using a card, said card associated with an account having a sum of funds available, said data and instructions which, when executed, adapt said computer system to: determine funds available for a budgetary item associated with said card if a financial transaction appertains to said budgetary item; if both said funds available for said budgetary item and said sum of funds available are sufficient to satisfy the value of said financial transaction, authorizing said financial transaction.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In the figures which illustrate exemplary embodiments of the present invention.

DETAILED DESCRIPTION OF THE PREFERRED EMBODIMENTS

Figure 1:
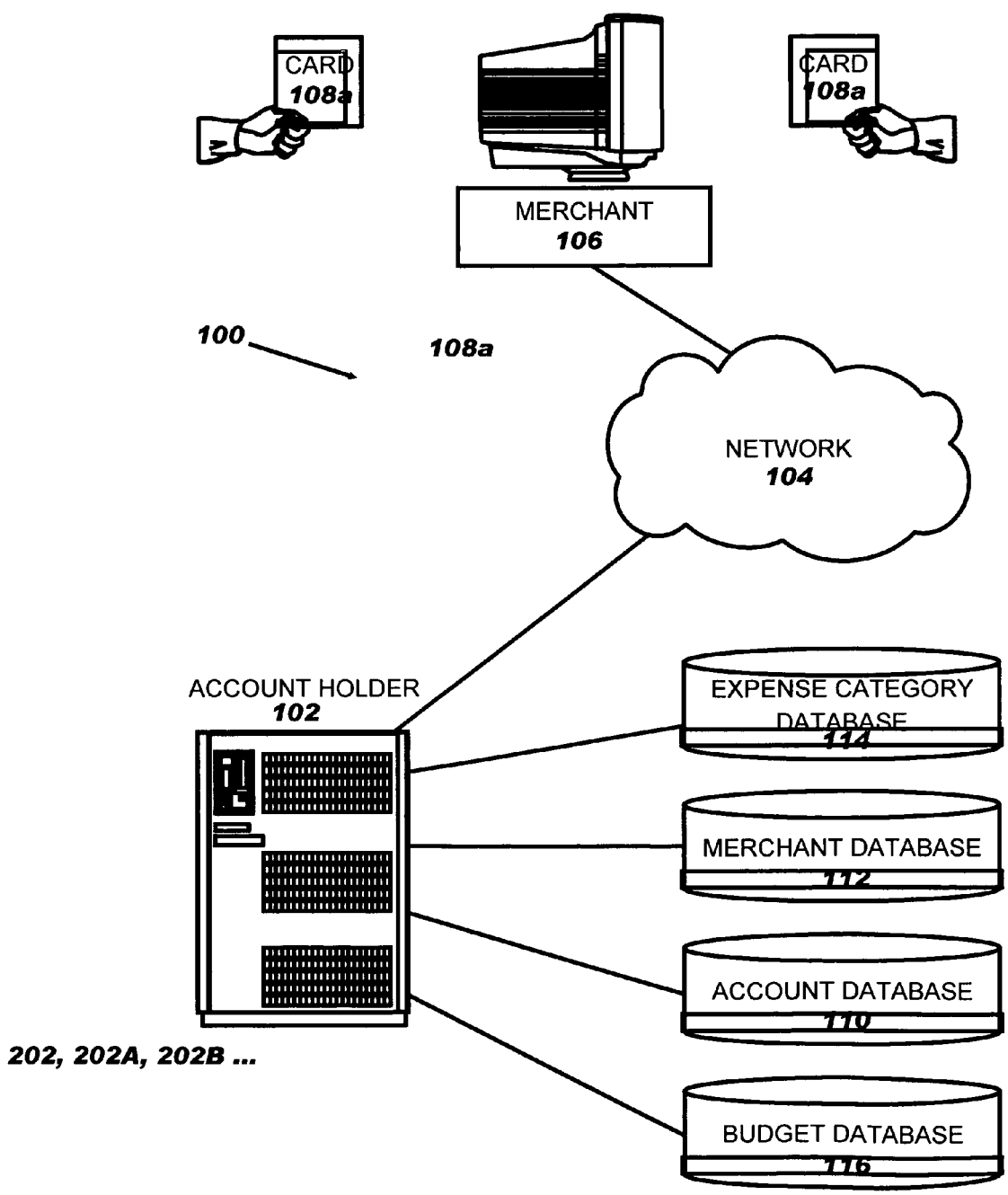
FIG. 1 schematically illustrates a system embodying aspects of the invention.

In overview, the embodiments described herein provide a simple way to place budgetary restrictions on the use of a card which will be used during a transaction.

Without limiting the foregoing, the following examples are given without reference to the figures to provide a broad understanding of the invention and the embodiments thereof described herein. A description of an embodiment referencing the figures is then provided.

For example, using an embodiment of the present invention a card holder may have placed a limit on expenditures (a budgetary restriction defined by a budgetary item) related to entertainment of $100.00 per month. Other budgetary items specifying, for example, a category of expenses (or, alternatively or additionally, specific item types or merchant names could also be employed), an amount and, optionally, a time period may also be created by the card holder. Each budgetary item may also be optionally associated with a "lock" value (e.g., a boolean value; TRUE indicates the budgetary item is locked and an override of the budgetary item restriction is not available; FALSE indicates the budgetary item is not locked and an override is available). The lock value indicates whether a card holder can override a restriction imposed by a budgetary item. In the present example, the card holder may indicate that it may be desirable to provide the option to override the entertainment budgetary restriction. As such, the card holder may set the "lock" associated with a budgetary item to FALSE.

Budgetary items (which collectively form the card holder's budget) may be created by accessing the account records relating to the card holder 108 maintained by the account holder (e.g., the financial institution issuing the card, the smart card, the financial institution associated with the debit card, etc.). This access may be performed electronically using a computer, for example, and a web site provided by the account holder. The card holder will then create or modify the various budgetary items. Alternative methods for creating a budget may be used. For example, a card holder could contact a person employed by the account holder, use an IVR system provided by the account holder, use a budget creation and storage system offered by a third party (e.g., financial software or financial online data providers such as, for example, Intuit or MSN Money) or use financial software (e.g., Intuit Quicken modified to provide the requisite functionality) on the card holder's networked computer system which may be located, for example, at the card holder's home, office or on a mobile device.

Assume in the above scenario, the card holder attempts to purchase movie tickets and popcorn in the aggregate amount of $25.00 from a movie theatre merchant (e.g., Loews/Cinplex). To receive authorization for the proposed transaction, either the card holder or the merchant will (typically) swipe the card through, or insert the card into, a card reader. This action will initiate a transaction for the proposed transaction wherein conventional transaction data will be transmitted (usually, but not exclusively, by electronic data transmission over a computer network) to the account holder. Responsive to the conventional transaction data received, the account holder will attempt to retrieve the card holder's budget. If no budget exists or cannot be retrieved for whatever reason, the transaction is performed conventionally. However, if a budget does exist for the account held by the account holder and associated with the card holder's card, then the account holder will determine whether sufficient funds are available to pay or cover the proposed transaction and whether there is any budgetary restriction(s) that has been placed on the account which may affect the whether authorization is granted for proposed transaction.

In the present example and assuming a budget was retrieved by the account holder, the account holder will attempt to categorize the proposed transaction into one of the categories in the budget retrieved. This categorization determination may be performed by the account holder on the proposed transaction in aggregate (i.e., a determination is made to identify a single category into which the entire proposed transaction will be placed) or the determination may be made based on the individual items which together form part of the proposed transaction. In this latter case, additional purchase detail data would be required by the account holder from the merchant. The purchase detail data may form part of the data initially transmitted by the merchant to the account holder or form a separate communication between the merchant and the account holder. Alternatively, the categorization determination may be made based on the merchant's identification.

In the above example, the categorization determination may be made based on the merchant's identification. That is, as the merchant is a movie theatre, proposed transactions made from this merchant may be categorized as "Entertainment". In this scenario, purchase detail data would not be required by the account holder. Rather, based on the merchant's identification, an account holder may have records (e.g., a database, look up table, etc.) which categorizes all purchases made from this merchant as "Entertainment", "Discretionary" or the like. Alternatively, enhanced transaction data describing the proposed transaction items could be used by the account holder to determine that the items forming the proposed transaction should also be categorized, individually as "Entertainment". In a further alternative, the separate items of the proposed transaction (described by the purchase detail data) could be used to separately categorize the movie ticket portion of the proposed transaction as "Entertainment" and the popcorn portion of the proposed transaction as "Dining", "Food" or the like.

Assume that the account holder has categorized the entire proposed transaction as "Entertainment". If the card holder has not made any other entertainment related purchases in the relevant period (in the example, the month) that exceed in aggregate $75.00 then the account holder would issue or transmit authorization data to the merchant authorizing the transaction. Additionally, the account holder would modify the budget of the card holder to indicate that a $25.00 purchase in the category of "Entertainment" was made.

If, in this example scenario, the card holder attempts to make further purchases of "Entertainment" related goods or services that when combined with other "Entertainment" purchases in the month would exceed $100.00 (the budgetary restriction placed on these types of purchases by the card holder) the account holder may transmit to the merchant data rejecting the proposed transaction. Alternatively, the account holder recognizing that the card holder is authorized to override the budgetary restriction (i.e., the budgetary item is not locked and override is available) may transmit data to the merchant to query the card holder as to whether to override the otherwise rejectable proposed transaction. Such an override may be provided by the card holder entering their personal identification number (PIN), other key sequence or other identification information into a merchant's card reader or the like. The card holder's override data would then be transmitted to the account holder by the merchant (which may include the merchant's card reader) and the proposed transaction is then authorized or rejected based on the card holder's response to the query.

In addition to the card holder providing budgetary item data, some embodiments of the present invention may allow for budgetary data to be provided to a financial institution by the account holder or a third party (e.g., a government welfare agency, a parent, a lending institution, etc.). For example, a parent may deposit into their child's/student's account $10,000.00 at the beginning of an eight month school year and place a $250/month limit on food expenditures, $500/month limit on rent, $125/month limit on entertainment, $75/month limit on dining, a $1600/year limit on books with the remainder ($800.00) being uncategorized (and thus available for any type of purchase). In such an instance, the third party depositor to the account associated with the card holder may "lock" the account thereby preventing the card holder from overriding a budgetary restriction. This may be a desirable feature in many instances.

Several methods or processes to assess whether a proposed transaction will invoke any budgetary restrictions are envisioned. In one such method, an account holder receives a detailed itemized list of the goods/services associated with a single proposed transaction. For each item in a transaction received by a financial institution, a look up in a database would be performed. Based on the look up for a particular item, the database would return a budget category (similar to the budget categories used when providing budgetary data to the financial institution). Therefore, if movie tickets and popcorn form part of the proposed transaction, the look up may return "entertainment" and "dining" as budget categories associated with each of the items described in the proposed transaction, respectively. In an alternative, a financial institution would look up the merchant in a database and return a budget category based on the goods/services provided by the merchant. For example, a purchase of products from McDonald's would be associated with a budget category "dining". Similarly, regardless of the goods purchased, Wal-mart may be associated with "household items" despite items being purchased that are not accurately categorized as such (e.g., typically CDs, DVDs and automobile parts and service are not considered "household items").

This invention can be used by many different organizations other than simply individuals. For example, companies can quickly, easily and effectively put in place restrictions on purchases made by their employees on company issued credit cards. For example, a corporate credit card may be issued by a company with categories associated with first class air travel, business class air travel and coach/economy class air travel. Rather, than simply granting "carte blanche" to air travel costing less than a prescribed amount or issuing guidelines or rules to their employees banning all air travel other than coach class, the company can enforce such guidelines by placing a budgetary restriction on first class air travel which exceeds $0.00 (i.e., all proposed transactions for first class air travel will be rejected). Other uses will be apparent to those of ordinary skill in the art.

As a further source of revenue, users of embodiments of the present invention (e.g., banks, governments, universities, etc.) may offer this budgetary service in conjunction with selected merchants (i.e., "approved merchants"). As such, budgets can be set so that purchases made on a card can, instead of being restricted to a typical budget category (e.g., "dining", "entertainment", etc.), could, in an alternative embodiment, be restricted to approved merchants (i.e., the categories are based on merchant IDs) or a combination of budget category and approved merchants. As a result, a government welfare or other agency (e.g., university, company, etc.) could negotiate a volume discount with an approved merchant for those persons receiving assistance (e.g., employees, welfare recipients, students, etc.). Recipients could then be restricted to make purchases only from the list of merchants approved by an assistance provider (e.g., the company, the government, etc.). To generate revenue from this embodiment of the invention, a financial institution may be able to receive some sort of payment from merchants wishing to become "approved". In return, the approved merchants will, likely, receive an increase in sales from card holders and third parties assistance providers (e.g., government agencies, universities) are assured that the assistance provided to a recipient is being used wisely and, beneficially, at the lowest possible costs.

Now, referencing the specific embodiment of the present invention illustrated in FIG. 1. a system 100 for completing a financial transaction is illustrated. System 100 includes account holder 102 in communication with merchant 106 via network 104. Merchant 106 is also in communication with cards (and/or card holders) 108.

It is to be understood that account holder 102, merchant 106 and card or card holder 108 are likely, in most embodiments of the present, to include the use of computer systems. However, embodiments of the present invention could use people in place of one or more the computer systems described hereafter. For example, merchant 106 may communicate verbally with an employee of account holder 102 over a telephone. In a further example, a card holder 108 could be a person verbally communicating with an employee of a merchant 106 over a telephone to place an order for goods or services from a catalog. Other combinations and permutations are also possible in embodiments of the present invention. As such, for ease of understanding, although some of the embodiments of the present invention describe account holder 108, merchant 106 and card or card holder 108 as being embodied in one or more computer systems, other non-computer embodiments are possible.

Account holder 102 maintains the accounts associated with cards 108. Typically, account holder 102 may be a financial institution (e.g., a bank, a credit card issuer or the like). However, account holder 102 may in fact be a card 108a in the instance where a card 108a is a smart card. Account holder 102 is likely to be in most embodiments of the present invention a computer system of a financial institution capable of processing many transactions. Such computer systems are well known in the art.

Account holder 102 may include the services provided by a voice call centre or an IVR system although these aspects are not illustrated in FIG. 1.

Account holder 102 stores conventional account records about the account associated with cards 108. This typically includes the names of the card holders, the account numbers, the account balances (either cash or credit) available in the accounts and the like. The information stored about the various accounts maintained by account holder 102 are typically stored in a database such as account database 110. Although account holder 102 is illustrated in direct communication with account database 110, account database 110 (like databases 112, 114 and 116 described below) may be hosted by other systems remote from account holder 102. In such an instance, account holder 102 may communicate with the various databases 110-116 via network 104 or via other networks.

Merchant database 112 is used and accessed by account holder 102 to store merchant data about the various merchants 106 with which account holder 102 communicates. Merchant data stored by merchant database 112 may include, for example, the legal name of the merchant, their geographical location, unique identifiers, type of merchant (e.g., clothing retailer, grocery stored, lumber yard, etc.). Other or different information pertaining to merchants 106 may also be stored by merchant database 112. Additionally, merchant database 112 stores data associating a merchant with one or more budget categories stored in budget category database 114. A merchant, despite selling different categories of goods and/or services may be associated with a single budget category. However, this may result in some transactions not being categorized as effectively as possible for some merchants or card holders. For example, a large department store such as Wal-mart sells many different types of goods from groceries, to automobile parts, to clothing to furniture. Associating such a merchant with a single budget category may lead to the miscategorization of transactions. However, using a single category to categorize goods and/or services for some merchants (e.g., McDonald's) may result in much greater accuracy when transactions involving those merchants are categorized. Nevertheless, in alternative embodiments, a merchant may be associated with one or more budget categories. The budget categories may be used to categorize a transaction based on an average purchase made from that retailer. For example, assume that 10% of the goods sold by a selected merchant can be categorized as "clothing"; 30% can be categorized as "groceries"; and the remaining 60% as "household supplies". These ratios can be stored in merchant database 112 and used to categorize a transaction. That is, a transaction authorized for $100.00 from the selected merchant would be categorized on a prorated basis. That is, the transaction regardless of the items actually being purchased would be categorized as $10.00 relating to "groceries", $30.00 categorized as "clothing" and $60.00 categorized as "household supplies". This estimate may not be very accurate for a single transaction, but for a large number of transactions the estimate is likely to be more accurate than simply categorizing all the purchases from a selected merchant into a single budget category. Using this scheme, each budget category associated with a particular merchant will also be associated with "prorating" data which is used to prorate a proposed transaction as described above. Other schemes to categorize expenses based on a merchant's identifier or name could equally be employed.

Budget category database 114 stores data describing various categories of expenses. In the exemplary embodiment, database 114 is used with merchant database 112 to associate a unique merchant identifier with one or more expenses categories. Additionally, budget category database 114 is used, in the exemplary embodiment, when a budgetary item (a portion of a budget) is being created or modified. The budget categories stored in database 114 are used to budget the funds which are to be spent from an account held by account holder 102 for card holder 108.

Further, in some embodiments (those embodiments which provide categorization of proposed transactions based on the identity of individual goods or services being purchased—in contrast to proposed transactions which are categorized in aggregate) budget category database 114 associates a budget category with a particular good or service. The purchase detail data for a particular item (e.g., a good or service) which may be transmitted to account holder 102 would be used to look up the budget category associated with that particular item. Various international trade classifications are known by those of ordinary skill in the art (e.g., the North American Classification System, the Standard International Trade Classification, the Nomenclature generate des Activities economiques dans les Communautes Europeennes—NACE, and others) and could be used to classify the various goods and services that may be purchased using a card 108a. In such an embodiment, purchase detail data transmitted from merchant 106 to account holder 102 would include data which classifies items into the one or more classification systems used by account holder 102 to associate budget categories with goods and/or services in database 114. Other systems or classifications to correlate a proposed transaction or the items or components of a proposed transaction to a budget category could equally be employed (e.g., UPC codes, etc.).

Budget database 116 stores a budget (if one exists) for an account held by account holder 102. A budget (described in greater detail with reference to FIG. 3) is, in the exemplary embodiment, typically created by a card holder for the account associated with a card holder's card 108a. However, elements of a budget may be created by third parties that have access (i.e., persons that have been granted complete or partial access to an account—e.g., or depositors to an account may be granted partial access to an account so as to be able to place restrictions on the use of funds deposited into the account by the third party) to an account held by account holder 102. In the exemplary embodiment, a card holder initiates a communication session with account holder 102 and creates a budget for the account associated with the card holder's card 108a by computer communication (e.g., via the world wide web portion of the Internet, custom software access, etc.), by voice communication or by IVR system. This budget is then stored in budget database 116.

However, other methods of providing account holder 102 access to a card holder's budget are also envisioned. For example, a card holder may create a budget "off line" (i.e., without communication with account holder 102) and then transmit this budget (or budget updates/modifications) to account holder 102 for storage and use. In this instance a budget could be created using commercially available financial software (e.g., personal financial software—Intuit's Quicken, Microsoft's MS Money, etc.; business financial software—Intuit's QuickBooks, MYOB's MYOB software; Great Plains software, etc.) suitably modified to provide the functionality described herein. In a further alternative, budgets created by a card holder may be stored not by account holder 102 but by another party such as the card holder or a third party. In such an instance, account holder 102 would typically access a budget housed by the card holder 108 or a third party by computer communication using network 104.

As will be appreciated by those of ordinary skill in the art, the delineation between databases 110-116 could be altered in alternative embodiments. For example, account database 110 and budget database 116 could be combined into a single database. Budget category database 114 could be split into a database only for budget categories and a separate database for data identifying the various goods and services which could be categorized. Other delineations are also possible.

Network 104 is in the exemplary embodiment a computer data network such as a LAN, WAN, the Internet, an extranet, direct connection (e.g., a dialup connection) or the like. However, network 104 may also include the public telephone network for instances where, for example, merchant 106 communicates with account holder 102 via telephone modem, by voice or using an IVR system.

Merchant 106 is a conventional data or point of sale terminal adapted to provide the functionality described herein. This may include, for example, a credit, debit or smart card reader, an electronic cash register or point of sale terminal. In some embodiments, merchant 106 is adapted to read card 108a, transmit conventional transaction data to account holder 102 and receive data authorizing, in part or in whole, the proposed transaction. However, in alternative embodiments, merchant 106 is adapted to transmit enhanced transaction data which describes in greater detail the individual goods and/or services (and/or the budget categories into which the goods and/or services fall) to account holder 102. In a further alternative embodiment (or in addition to those described above), merchant 106 is adapted to receive data from account holder 102 which indicates that a proposed transaction (or a portion thereof) is rejectable and will be rejected unless override authorization is received by account holder 102 to override a budgetary restriction. Such override authorization (which either grants or refuses to grant account holder 108 with authorization to override) is adapted to be received from card holder 108 by merchant 106. The override authorization is then transmitted by merchant 106 to account holder 102.

Cards 108 are, in the exemplary embodiment, debit cards, credit cards or smart cards or combinations thereof. Other methods of payment that do not use physical currency could also be used (e.g., cheques, smart tags or smart key fobs, etc. —although embodiments of the invention are likely not to be implemented using cheques although this is certainly possible).

Figure 2:
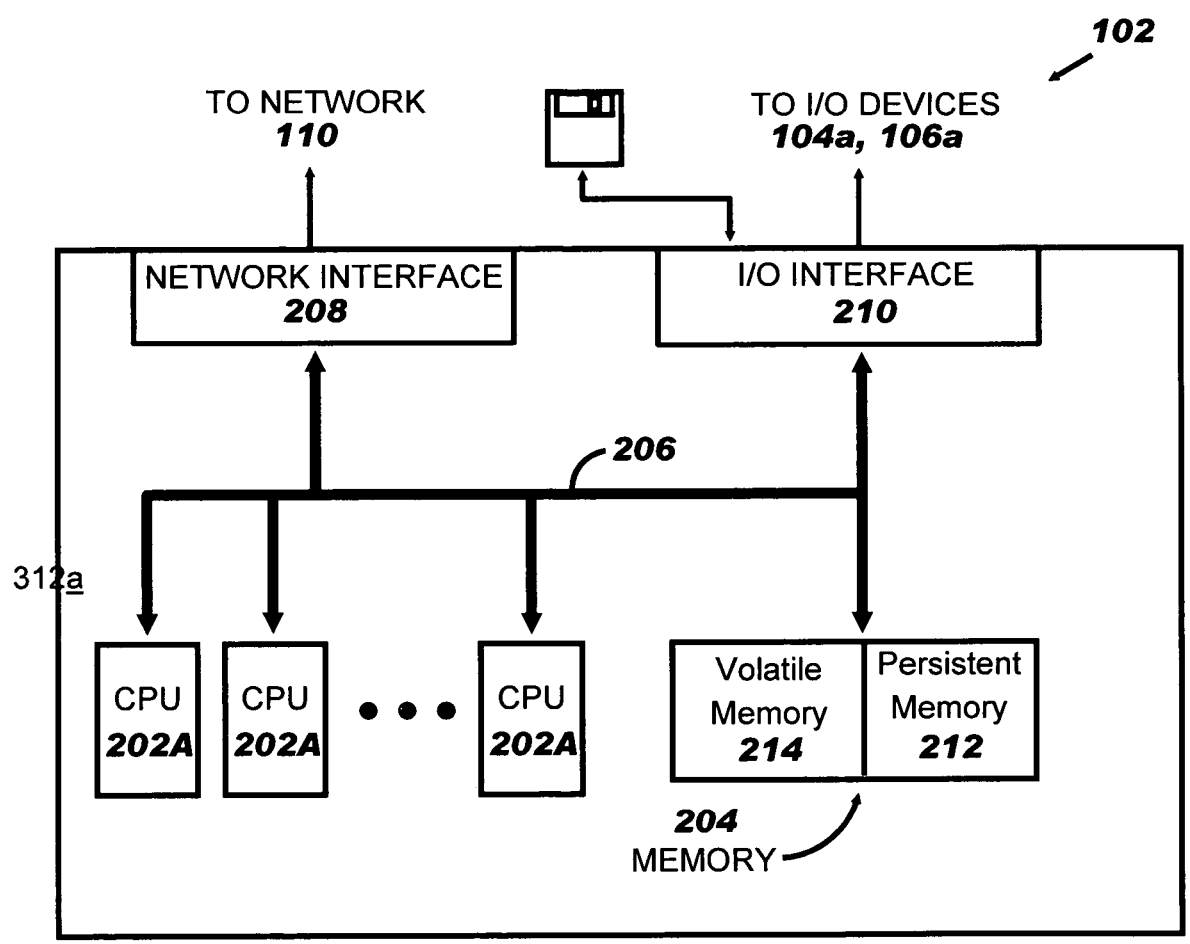
FIG. 2 schematically illustrates, in greater detail, a first portion—an account holder, forming part of the system of FIG. 1.

Account holder 102 is illustrated in greater detail in FIG. 2. It is to be noted that although account holder 102 is illustrated for sake of simplicity as a single device (e.g., a mainframe computer) it may in fact be embodied in multiple systems with each system charged with a portion of all the functions, one or more complete functions, or a portion of one or more functions described herein.

Account holder 102 communicates with various input devices 104a, output devices 106a and network 104. Input devices 104a may include, for example, a keyboard, terminals, remote computer systems, a mouse, a scanner, an imaging system (e.g., a camera, etc.) or the like. Similarly, output devices 106a may include displays, information display unit printers and the like. Additionally, combination input/output (I/O) devices may also be in communication with account holder 102. Examples of conventional I/O devices include removable and fixed recordable media (e.g., floppy disk drives, tape drives, CD-ROM drives, DVD-RW drives, etc.), touch screen displays and the like.

As illustrated, account holder 102 includes several components—central processing unit (CPU) 202 (which includes a plurality of CPUs—202A, 202B, ... ), memory 204, network interface (I/F) 208 and I/O I/F 210. Each component is in communication with the other components via a suitable communications bus 206 as required.

CPU 202 is a processing unit, such as an Intel Pentium™, IBM PowerPC™, Sun Microsystems UltraSparc™ processor or the like, suitable for the operations described herein. As will be appreciated by those of ordinary skill in the art, other embodiments of account holder 102 could use alternative CPUs and may include embodiments in which one or more CPUs are employed. CPU 202 may include various support circuits to enable communication between itself and the other components of account holder 102.

Memory 204 includes both volatile memory 214 and persistent memory 212 for the storage of: operational instructions for execution by CPU 202, data registers, application storage and the like. Memory 204 preferably includes a combination of random access memory (RAM), read only memory (ROM) and persistent memory such as that provided by a hard disk drive. Stored within memory 204 may be one or more of databases 110-116.

Network I/F 208 enables communication between computer system 100 and other network computing devices (not shown) via network 104. Network I/F 208 may be embodied in one or more conventional communication devices. Examples of a conventional communication device include an Ethernet card, a token ring card, a modem or the like. Network I/F 208 may also enable the retrieval or transmission of instructions for execution by CPU 202 from or to a remote storage media or device via network 104.

I/O I/F 210 enables communication between account holder 102 and the various I/O devices 104a, 106a. I/O I/F 210 may include, for example, a video card for interfacing with an external display such as output device 106a. Additionally, I/O I/F 210 may enable communication between account holder 102 and a removable media. Although removable media is illustrated as a conventional diskette other removable memory devices such as Zip™ drives, flash cards, CD-ROMs, static memory devices and the like may also be employed. Removable media may be used to provide instructions for execution by CPU 202 or as a removable data storage device.

The computer instructions/applications stored in memory 204 and executed by CPU 202 so as to adapt the operation of computer system of account holder 102 to function as described herein. As will be appreciated by those of ordinary skill in the art, the delineation between aspects of the applications described herein and attributed to account holder 102 is somewhat arbitrary as the various operations attributed to a particular application or function as described herein may, in alternative embodiments, be subsumed by another computer programmed application.

Figure 2A:
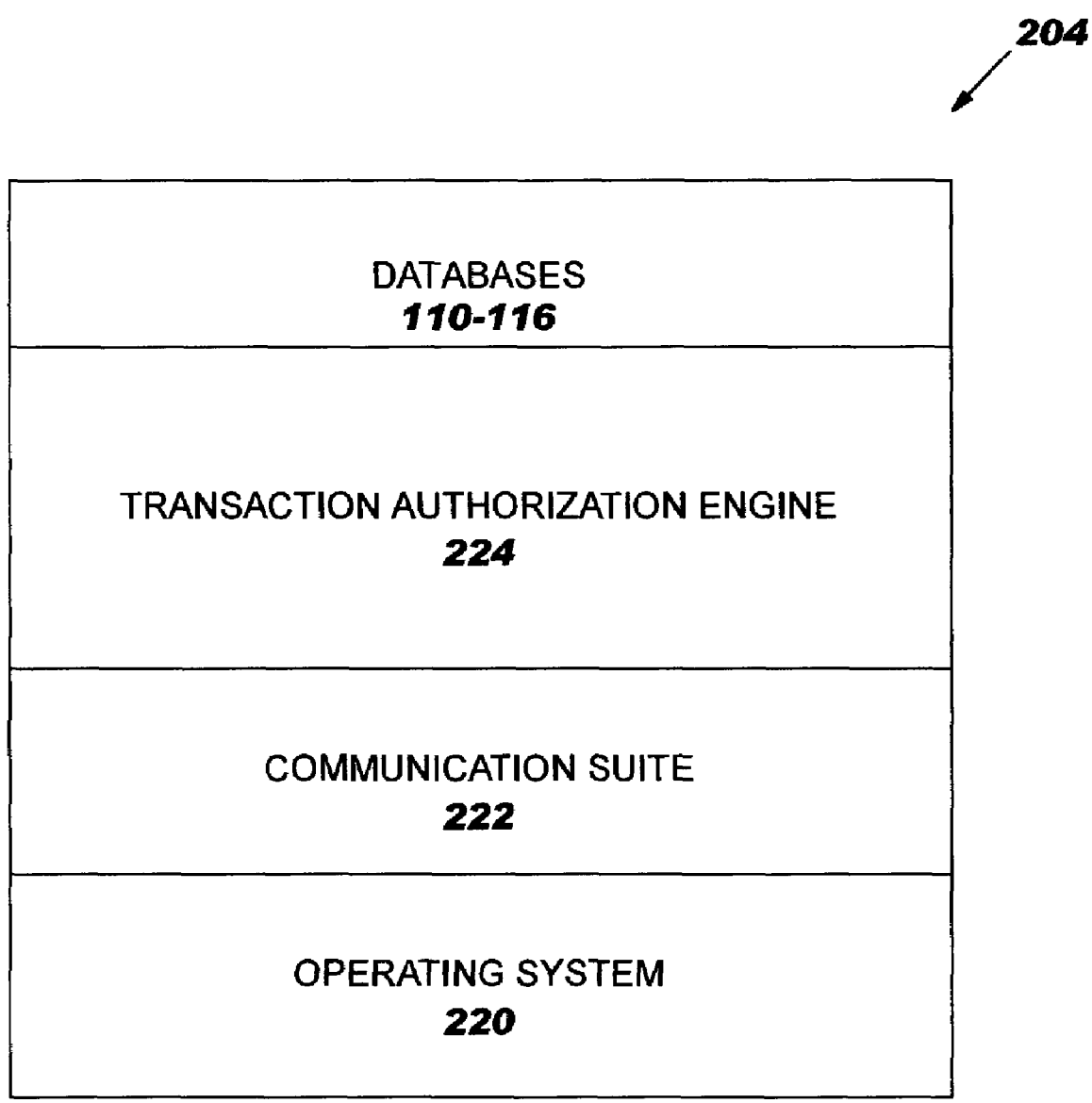
FIG. 2A illustrates, in functional block form, a portion of FIG. 2.

Referencing FIG. 2A, as illustrated, for exemplary purposes only, memory stores an operating system (OS) 220, communications suite 222, transaction authorization engine 224 and databases 110-116.

OS 220 is an operating system suitable for operation with a selected CPU 202 and the operations described herein. Multitasking, multithreaded OSes such as, for example, IBM AIX™, Microsoft Windows NT™, Linux or the like, are expected in many embodiments to be preferred.

Communication suite 222 provides through interaction with OS 220 and network I/F 208 (FIG. 2) suitable communication protocols to enable communication with other networked computing devices via network 104 (FIG. 1). Communication suite 222 may include one or more of such protocols such as TCP/IP, ethernet, token ring and the like.

Transaction authorization engine 224 (hereinafter "engine 224") provides functionality to receive proposed transactions, retrieve and access and modify the contents of databases 110-116 and authorize and/or reject proposed transactions in whole or in part. Although a detailed description of the functions of engine 224 are provided below with reference to FIGS. 4-6, briefly engine 224 provides the functionality to receive proposed transactions from merchants 106 (which may include conventional transaction data or enhanced transaction data), retrieve budgets associated with a card holder 108, determine whether to authorize (in full or in part) or reject (in full or in part) the requested proposed transaction based on the transaction data describing the account associated with a card 108 and any related budget. Additionally, and optionally, engine 224 may transmit data to, and receive data from merchants 106 and card holders 108 relating to any potential override of budgetary restrictions which resulted in a full or partial rejection of a proposed transaction. Additionally, and as described below in greater detail with reference to FIG. 3, engine 224 enables a card holder 108 to access their account record data maintained by account holder 102 and create and/or modify a budget which is to be associated with the card holder's account.

Databases 110-116 are, in the exemplary embodiment stored by account holder 102. However, as noted above, these databases could be individually or collectively maintained by one or more other systems.

Figure 3:
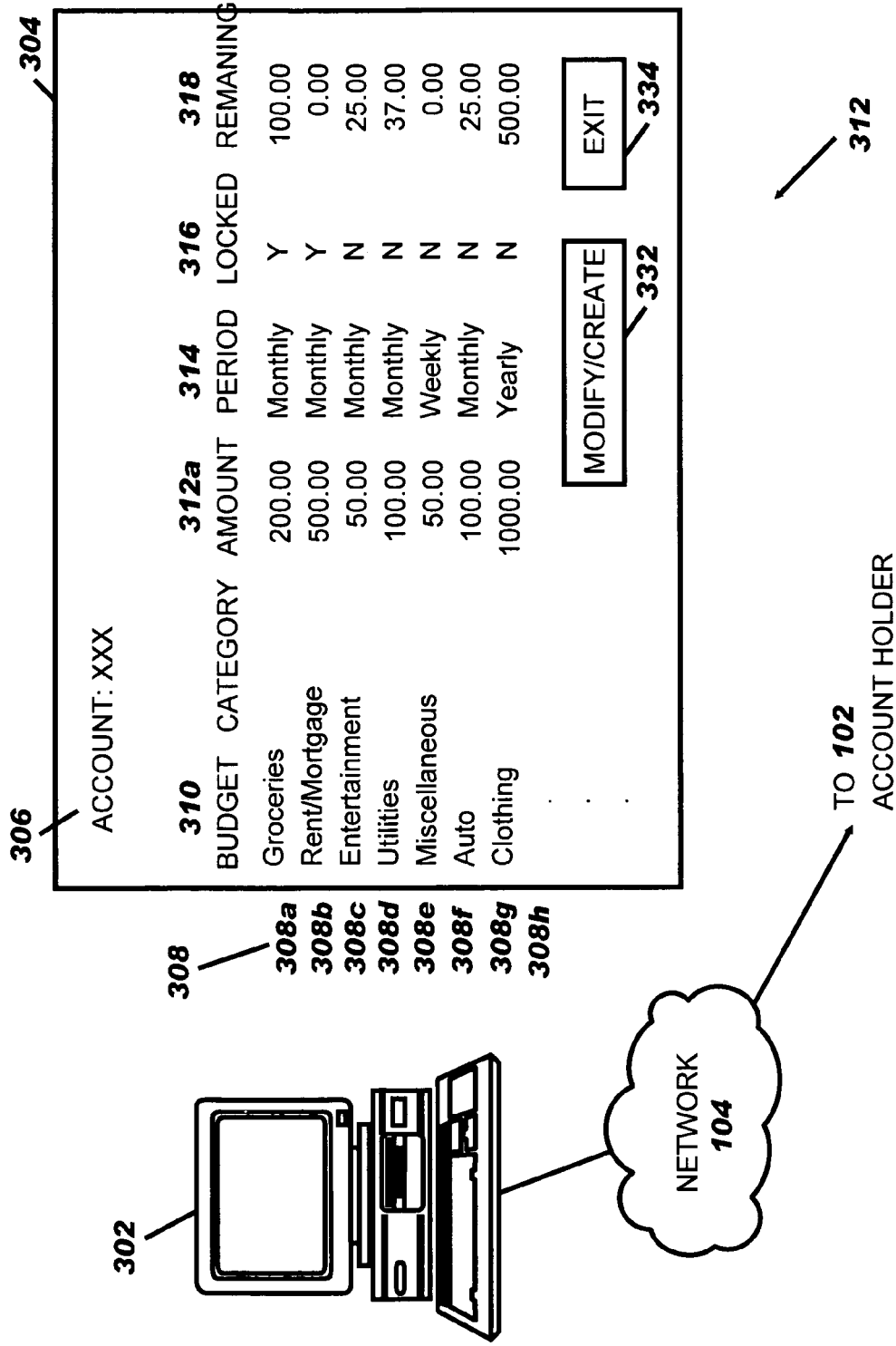
FIG. 3 illustrates a second portion of the system of FIG. 1.

Referencing FIG. 3, an exemplary manner to create and modify a budget which is to be associated with the account tied to a selected card 108 is illustrated. In the exemplary embodiment, a card holder uses a computer system 302 to access account record data maintained by account holder 102 in account database 110 (not shown in FIG. 3). If a budget is being created for the first time, the budget created will, when requested by the card holder 108 be stored by account holder 102 in budget database 116 (not shown in FIG. 3). Computer system 302 (which includes many similar, but likely less capable, components to those illustrated in FIG. 2A) communicates with account holder 102 via network 104. In the exemplary embodiment, computer system 302 includes and uses a conventional world wide web browser (e.g., Netscape Navigator, Microsoft Internet Explorer, etc.) to access the account record data maintained by account holder 102 and to create a budget associated thereto. However, alternative methods of accessing the data stored by account holder 102 and creating/modifying a budget could be employed. For example, this interaction between card holder 108 and account holder 102 could be enabled through the use of personnel employed by the card holder, an IVR system or software (e.g., non-web based systems) which are used by computer system 302. An example of the latter implementation is where financial software (e.g., Intuit Quicken) has been modified to create a budget which is transferable or transmitted (in whole or in part) account holder 102. In a further alternative, budgets may be created by a card holder and stored by a trusted third party. For example, it is known in the art to create and store financial stock portfolios on systems maintained by providers of financial services and/or financial data. Many people presently store one or more financial portfolios of stocks and mutual funds on the systems of the popular web sites CNN.com, CNBC.com, Quicken.com and the like. Similar to these portfolios, budgets could be created by card holders 108 which are stored by these third parties. On request to a third party from account holder 102, the entire budget (or portions thereof) stored by the third party for a particular card holder whose account is maintained by account holder 102 could be transmitted to account holder 102 from the third party.

Referencing FIG. 3, a budget display screen 304 is illustrated which displays a budget 312 of card holder 108 for account 306 maintained by account holder 102. Budget 312 in the exemplary embodiment is stored by account holder 102 and has been retrieved by card holder 108 based on an HTTP request issued by the web browser stored and used by computer system 302.

Budget 312 includes a plurality of budgetary items 308 (eight such budgetary items are illustrated: 308a-308h). Each budgetary item is associated with several budgetary data fields: budget category 310, budget amount 312a, time period 314, lock 316 and amount or balance remaining 318. It should be noted that exemplary budgetary data fields 310-318 are not exhaustive (i.e., other fields could be used) and, additionally, not all data fields 310-318 are required in alternative embodiments. For example, the "lock" field which, as noted above, may allow a transaction which has been rejected due to a budgetary restriction to be overridden, is optional. Similarly, time period field 314a is optional as some budgetary items may be "one time only" type expenses (e.g., a category created by the card holder 108 for their wedding or funeral related costs) or the card itself may be a single use or stored funds type card that is discarded or alternatively "recharged". These single use type cards are issued by many telecom companies in many parts of the world. Additionally, a data field identifying a particular merchant (by ID, name, etc.) could additionally or alternatively be employed.

Budget category 310 indicates the budget category into which purchased items may fall. In the exemplary embodiment, the budget categories available to be associated with a budgetary item 308 are predefined by account holder 102 by the budget categories stored by account holder 102 in budget category database 114 (FIG. 1). However, in alternative embodiments, card holder 108 could define personal budget categories in addition to, or replacement of, those stored by account holder 102. The budget categories illustrated (groceries, rent/mortgage, entertainment, . . . ) in FIG. 3 may be appropriate for personal budgeting. However, additional or different categories could be used for non-personal (i.e., commercial) use.

Budget amount 312a indicates the amount that a card holder 108 has allocated to a particular budget category 310. For example, in the budget 312 illustrated, the card holder 108 has allocated $200.00 in budget amount 312a for budgetary item 308a to the budget category "groceries".

Time period 314 indicates whether a budgetary item is a recurring expense and, if so, the time period during which it is to recur. For example, mortgage payments are typically payable weekly, biweekly, semi-monthly or monthly. As such, in the illustrated example, budgetary item 308b indicates that the card holder 108 has a monthly rent or mortgage payment. At the end of the time period indicated (if any) by the time period 314 value for a budgetary item 308, the amount available or remaining (indicated by the associated value in the amount remaining column 318) is reset to the amount in column 312a.

The amount remaining column 318 displays a current amount value which, in the exemplary embodiment, is not modifiable by the card holder 108. The value indicated by column 318 indicates the amount budgeted during the current time period (indicated by the value in the column 314 for a budgetary item 308) less any expenditures for that budget category paid during the same time period.

For example, the budgetary item 308a indicates that the card holder 308a1 desires to spend no more than $200.00 (in column 312a) every month (in column 314). The value in the amount remaining column 318 indicates that there is $100.00 remaining in the budget category "groceries" (indicated by the value in column 312a) for the current month (indicated by the value period column 314). As such, a card holder 108 would be able to ascertain that during the current month $100.00 ($200.00–$100.00) has been spent on "groceries" so far. At the end of the month (or the beginning of the subsequent month) the value in the amount remaining column 318 ($100.00) would be reset to the value in the budget amount column 312a ($200.00). In another example, budget 312a indicates that of the $100.00 budgeted for "Utilities" in budgetary item 308d and $37.00 (column 318) remains available for the current month (column 314). As such, a card holder 108 would be able to ascertain that during the current month $73.00 ($100.00–$37.00) has been spent on "Utilities" during the current month.

Lock 316 indicates whether a card holder 108 would be able to override a proposed transaction rejectable by engine 224 of account holder 102 due to a budgetary item 308. If the value in lock column 316 is "Y", a budgetary item 308 which would otherwise result in a rejected transaction can be overridden so that the transaction is authorized (assuming total funds available in the account are sufficient to pay for the transaction). If a card holder 108 does not have authorization to override a transaction rejectable due to a budgetary restriction, the lock may prevent unauthorized or impulse (i.e., spur-of-the-moment) type purchases to be made by card holder 108.

In some cases, the value in locked column 316 may be set by a third party (e.g., a parent, a social agency, a government, a university, etc.). Additionally, if a locked value in locked column 316 is set by either the card holder 108 or a third party, some embodiments of the present invention prevent the value in locked column 316 from being changed by card holder 108.

Two buttons, modify/create button 332 and exit button 334, are also provided by budget display screen 304. The modify/create button 332 allows a budgetary item 308 to be created when no budgetary item 308 is selected (or, alternatively, when the NEW budgetary item is selected). Additionally, when a budgetary item 308 is selected (other than the NEW item), the selected item 308 can be modified. Exit button 334 terminates the viewing, modification or creation of budgetary data associated with budget 312.

Figure 3A:
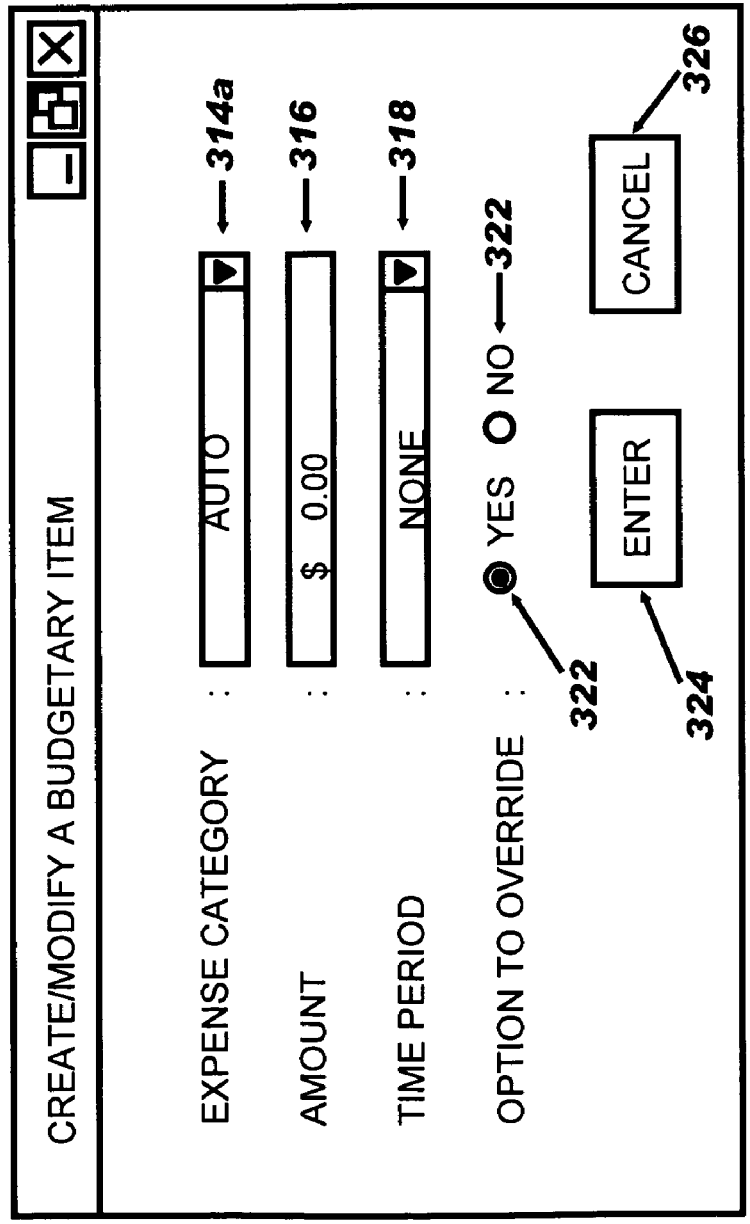
FIG. 3A illustrates a portion of FIG. 3.

An exemplary budgetary item create/modify input screen 330 is illustrated in FIG. 3A. Input screen 330 is displayed to a card holder 108 when a new budgetary item 308 (FIG. 3) is to be created or when a previously created budgetary item is to be modified. Input screen 330 is accessed by using the modify/create button 332 (FIG. 3). In a further embodiment, access to input screen 330 may be reserved to only authorized users. Authorized users may include, for example, card holders, supplementary card holders, assistance providers, account holder 102 and others. Access may be restricted by use of a password or the like.

A user (e.g., a card holder 108 or a third party) explicitly modifying a budget 312 is presented with several input fields that correspond to some of the data fields 310-316 which form part of budget display screen 304.

Budget category input field 314a presents a user with a drop down box (in a graphical user interface environment) of budget categories into which expenses may be allocated. In the exemplary embodiment, the drop down box is populated by engine 224 (FIG. 2A) of account holder 102 from data retrieved from budget category database 114. In the exemplary illustration, the budget category "Auto" has been selected by a user. Once the budgetary item has been saved (by selecting the "ENTER" button 324), a budgetary item 308 (FIG. 3) will have been created/modified and associated with the category input into category input field 314a and will be displayed in category column 310 (FIG. 3). In the exemplary embodiment, if input screen 330 is displayed as a result of a request to modify a previously created budgetary item 308, then the budget category input field 314a will initially display the value in expense column 310 associated with the selected input field.

In certain situations, the budget category input field 312a may not be editable by a user (e.g., the expense input field 314a is displayed but the ability to modify the selected budget category is not available). This may be the case where a user is granted read only access to the entirety of budget 312 or only portions thereof (i.e., read only access to a restricted portion of budgetary items 308). Such a case may occur when the budgetary item was created by a third party and not by the holder of card 108a.

Amount input field 316a allows the input of data (in the exemplary embodiment through use of keyboard but other input means are equally useable) to indicate the amount of funds that can be spent in the category selected in category input field 314a for a time period input (if any) in time period input field 318. The value input by a user into amount input field 316a will, when "ENTER"ed by user, will be displayed in amount column 312a.

Similar to the budget category input field 314a, amount input field 316a may not, in every case, be modified by a user. In such a case, amount input field may be displayed but cannot be modified. Additionally, and also similar to category input field 314a, if input screen 330 is displayed as a result of a request to modify a previously created budgetary item 308, then the amount category input field 316a will initially display the value in amount column 312a associated with the selected input field. The budget may be canceled using cancel button 326.

Input of data into time period input field 318 is, in the exemplary embodiment, optional. The exemplary embodiment provides a user with a drop down box with time periods frequently used by users. These include (but are not shown): none, weekly, biweekly, semi-monthly, monthly, quarterly, yearly and Custom (where "Custom" allows a user to a define a customized time period). The time period input by a user (by selecting one of the items from the drop down box) and "ENTER"ed will be displayed in time period column 314 in budget 312.

Similar to the budget category input field 314a, time period input field 318 may not, in every case, be modified by a user. In such a case, the time period input field may be displayed but cannot be modified. Additionally, and also similar to category input field 314a, if input screen 330 is displayed as a result of a request to modify a previously created budgetary item 308, then the time period input field 318 will initially display the value in time period column 314 associated with the selected input field.

Option to override input fields 320 and 322 enables a user to select whether a budgetary restriction can be overridden in the case where a proposed transaction is otherwise rejectable by account holder 102 due to a budgetary restriction. If a budgetary item can be overridden, a user selects the YES input field 320. In the opposite case, the NO input field 322 is selected. Once "ENTER"ed the selected one of input fields 320, 322 will be displayed in lock column 316.

Similar to the budget category input field 314a, option to override input fields 320, 322 may not, in every case, be modified by a user. In such a case, option to override input fields may be displayed but cannot be modified. Additionally, and also similar to category input field 314a, if input screen 330 is displayed as a result of a request to modify a previously created budgetary item 308, then one of the option to override input fields 320, 322 will initially display the value in locked column 316 associated with the selected input field.

Once the creation of modification of a budgetary item has been satisfactorily completed by a user, a user selection of the ENTER button 324 will result in the modified/created budgetary item 308 being stored in budget database 116 (FIG. 1) by account holder 102. Additionally, budget 312 displayed by budget display screen 304 will be updated to reflect the changes.

Figure 4:
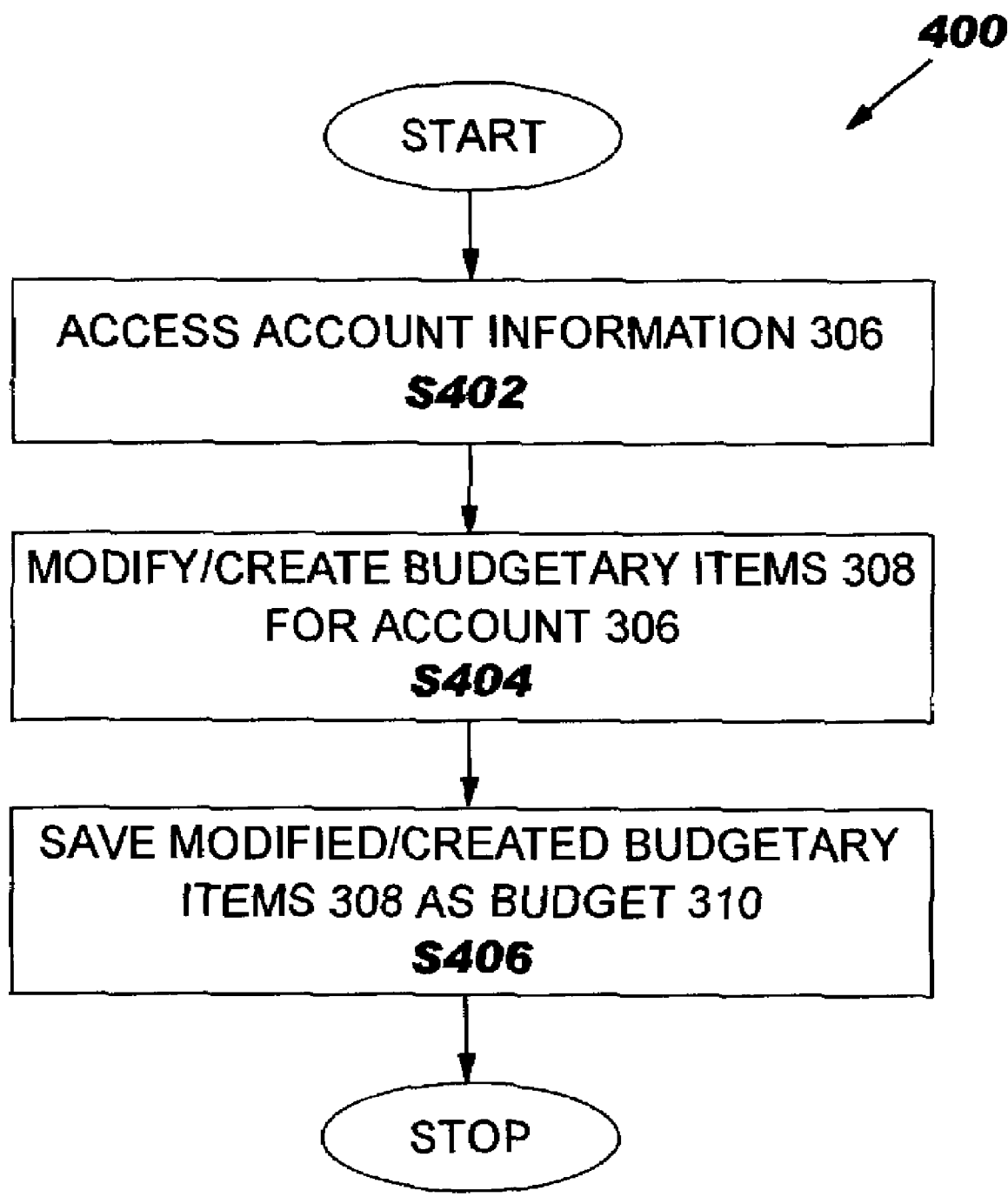
FIG. 4 is a flowchart exemplary of a first set of operations of the system of FIG. 1.

Operations 400, depicted in flow chart form in FIG. 4, illustrate the operations described above with reference to FIGS. 3 and 3A. Initially, a user (e.g., a card holder, a parent, etc.) desires access to account information 304a to change or modify a budget 312 associated with a particular account 306 (S402). Once access is granted, a budget 312 (if one exists) is retrieved by engine 224 from budget database 116. The modification or creation of budgetary items 308 are then processed by engine 224 based on user input (S404). The various budgetary items 308 of the budget 312 are then stored in budget database 116 by engine 224 of account holder 102 (S406).

The access granted by engine 224 (S402) may be explicit or implicit. FIGS. 3 and 3A illustrate an explicit access to a budget 312. However, a depositor to an account 306 may, for privacy reasons, simply be able to deposit funds to an account while requesting that the funds deposited be associated with budgetary item data (where budgetary data includes one or more of the following elements: one or more budget categories, a time period, an amount—typically a portion or the entire amount of the deposit, and indication of whether a budgetary restriction can be overridden). The budgetary item data may be then input into budget 312 by a party trusted by the card holder 108 (e.g., an employee of account holder 102). If funds deposited in this manner are to be associated with a budget category which already forms part of a budgetary item 308 in budget 312 associated with account 306, then the budgetary item 308 (and thus budget 312) is suitably modified by engine 224 of account holder 102.

For example, if a parent desires to desires to deposit $1000.00 in their child's chequing account, the parent may wish to have all or part of the $1000.00 allocated to one or more budgetary items. Assume, that the parent wishes to allocate $500.00 for "Rent/Mortgage" which is associated with a "Monthly" time period and cannot be overridden; $400.00 for "Groceries" with no time period and cannot be overridden; and $100.00 for "Entertainment" with no time period which can be overridden. Further assume that the exemplary budget 312 illustrated in FIG. 3 is the budget associated with the child's account 306. In this example, budgetary data describing the three allocations are provided to account holder 102 at the time of deposit of the $1000.00. The parent, in this exemplary situation is not provided with explicit access to budget 312 but rather implicit access wherein the account holder 102 explicitly modifies budget 312 of the child's account 306. As a result of this deposit and implicit access, one existing budgetary item 308 will be modified and two new budgetary items will be created. The two budgetary items which will be created are the "Groceries" item and the "Entertainment" items. Although budgetary items exist which are also associated with the "Groceries" and "Entertainment" budget categories (namely items 308a and 308c), the remaining budgetary item data associated with these two existing budgetary items are not identical to that provided by the depositor/parent. For example, budgetary item 308 indicates that the funds presently allocated to "Groceries" can be spent over a monthly time period. In contrast, the depositor/parent has not specified a time period (indicating that $400.00 of $1000.00 can be spent only on groceries but at any time). Similarly, budgetary item 308c indicates that only $50.00 can be spent monthly on Entertainment related expenses. In contrast, there is no time period associated with the $100.00 being deposited which are to allocated to Entertainment Expenses.

In contrast to the two new budgetary items 308 created by a third party depositor, budgetary item 308b will be modified as a result of the $500.00 being allocated to "Rent/Mortgage" expenditures by the depositor since the budgetary data associated with the deposited funds allocated to this expense item is identical to that in budgetary item 308a (i.e., same budget category, same time period and same locked value). In the exemplary embodiment, the value in column 318 will be modified by increasing the amount remaining by the amount deposited and allocated to the budget category. In an alternative embodiment, the value in amount budgeted column 312a could be increased by the amount deposited and allocated to the budget category. In a further alternative both the amount budgeted and the amount remaining columns 312a, 318 could both be increased by the amount deposited and allocated to the budget category. Once the entirety of the $1000.00 has been spent, account holder 102 modifies the card holder's budget 312 to delete/modify the created/modified budgetary items 308 to return budget 312 to its state prior to the modification resulting from the third party depositor.

Figure 5:
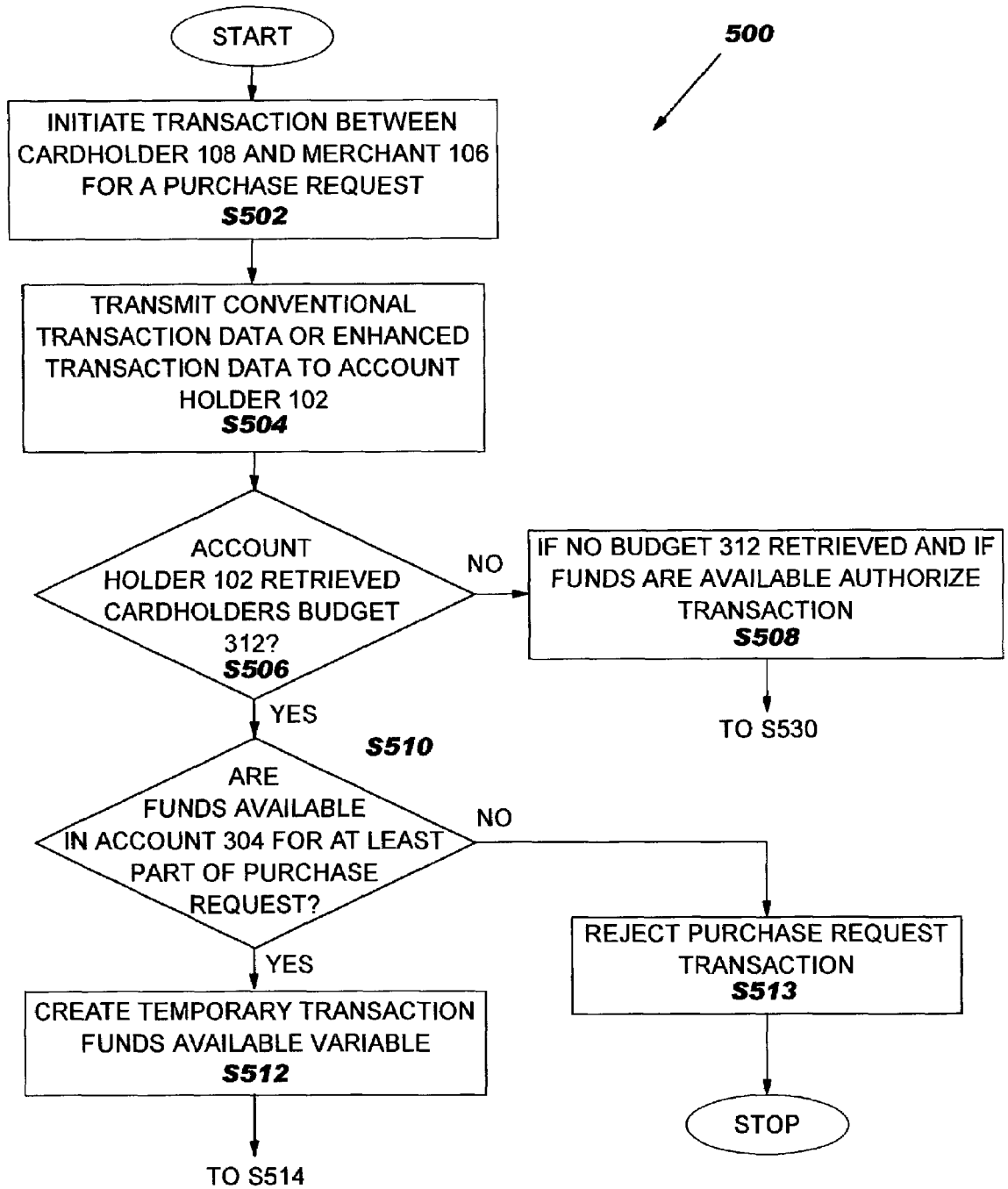
FIG. 5, which covers two drawing sheets, is a flowchart exemplary of a second set of operations of the system of FIG. 1.
Figure 5:
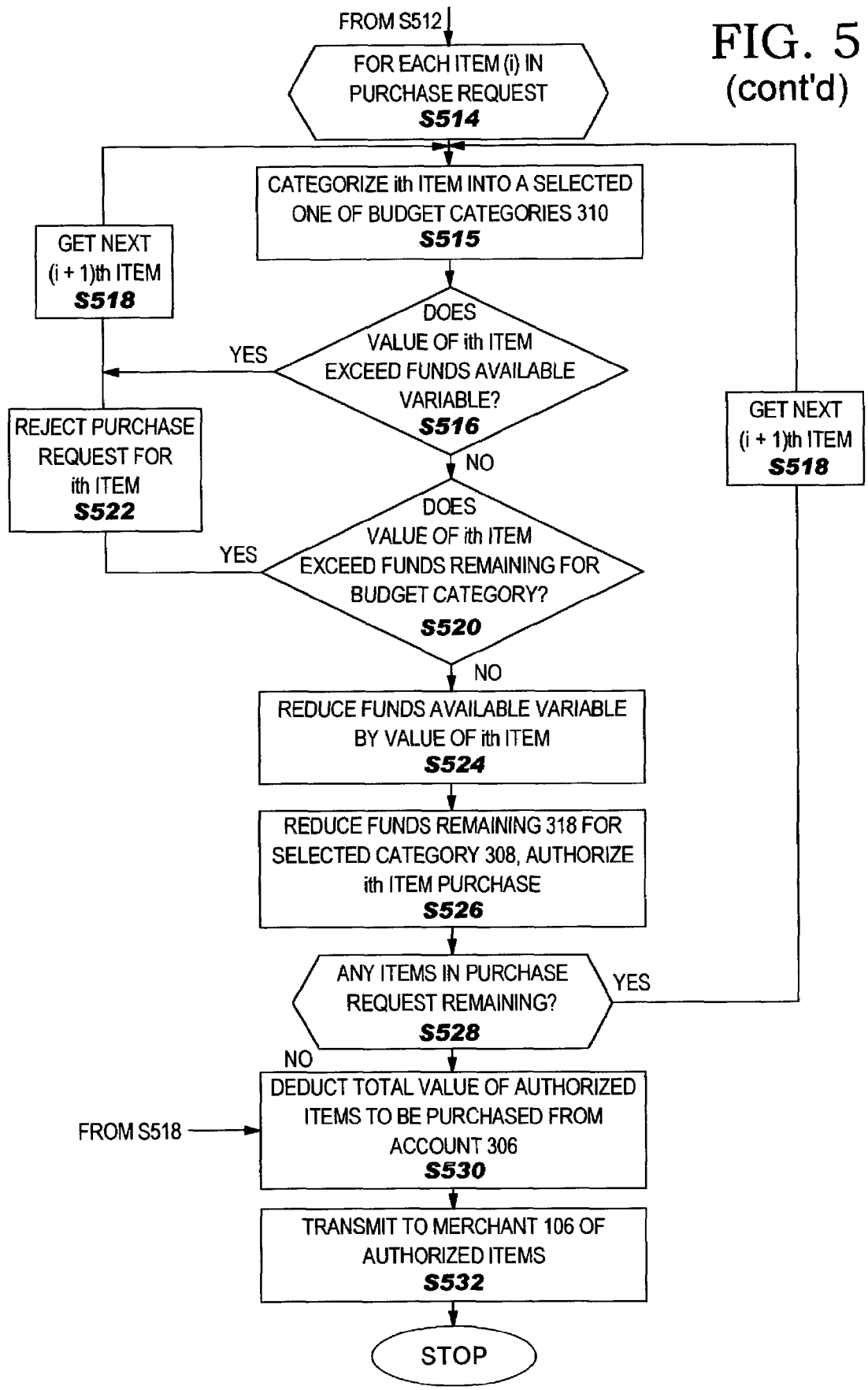

FIG. 5 illustrates, in flow chart form, operations 500 which are performed as a result of purchase being attempted using a card 108a. A transaction is initiated between a merchant 106 and a card holder using a card 108a (S502). A transaction is typically initiated by a card 108a being inserted into a card reader at the merchant's point of sale terminal. Responsive to this initiation of a transaction, conventional or enhanced transaction data (described above) is transmitted (in a single burst or piecemeal) by merchant 106 to the account holder 102 of the account associated with the card 108a (S504). The data transmitted will include, typically, the amount of the transaction, the account number and the merchant's ID.

Responsive to the data transmitted to it, account holder 102 will attempt to retrieve a budget 312 from budget database 116 associated with the particular account 306 (S506). If no budget 312 has been created or budget 312 is unavailable, the requested transaction is performed conventionally (S508). That is, if funds are available in account 306 to satisfy the proposed transaction, the proposed transaction is authorized, the funds are deducted from the funds available for future purchases from account 306 (S530) and authorization is transmitted to the merchant 106 (S532). If funds are not available, the transaction is rejected and the rejection is transmitted to the merchant (S530 and S532).

However, if a budget 312 is retrieved by account holder 102 (S506), the transaction data (conventional or enhanced) describing the proposed transaction is compared against the budgetary items 308 of retrieved budget 312 (S510-S528). If the proposed transaction is to be either rejected or authorized in aggregate then operations S510-S528 (or portions thereof) are only performed once for the entire proposed transaction. This may occur where only conventional data is transmitted or where the categorization of the individual items which are included in the proposed transaction are categorized based on the merchant ID. If the individual items which are included in the proposed transaction are to be individually categorized and authorized or rejected, then operations S510-S528 will be performed once for each item (or once for each category if the proposed transaction is organized by category rather than by individual goods or services).

During operation S510, engine 224 will determine whether funds are available in account 306 to satisfy at least part of the proposed transaction. If sufficient funds are not available to satisfy at least part of the proposed transaction to the level of detail requested (i.e., in aggregate or based on the individual items), the proposed transaction is rejected and this determination transmitted to merchant 106 (S512).

However, if at least part of the proposed transaction can be satisfied by the funds available, operations S512-S528 are performed for each item (which may, as noted above, be the entire proposed transaction) in the proposed transaction.

In operations S512-S528, operations are performed for each item in the proposed transaction starting with the item described first in the transaction data transmitted. However, other routines for ordering the processing of each item in the proposed transaction could be used in alternative embodiments. For example, ordering from least expensive item to most expensive item, random ordering or ordering based on the categories into which the items fall. Other ordering could equally be employed.

Once it is determined that some funds are available to cover at least a part of the proposed transaction, a temporary variable is created which temporarily stores the total funds available to satisfy the proposed transaction (S512). Thereafter, for each $i^{th}$ item included in the proposed transaction (there may be only one item), operations S515-S528 are performed.

Initially, engine 224 attempts to categorize the $i^{th}$ item into one of budget categories found in category column budget 310 (S515). Such a determination is made based on the transaction data transmitted.

If the transmitted data includes only conventional transaction data then a determination of the categorization of the proposed transaction, in aggregate, is performed based on the merchant ID or other identifier of the merchant (e.g., merchant name). By accessing merchant database 112 using the conventional transaction data, one or more budget categories will be retrieved. If more than one budget category is retrieved, then prorating data will also be retrieved. The prorating data is used by the exemplary embodiment to prorate the proposed transaction value into budget categories also retrieved.

If the transmitted data includes, in addition to conventional transaction data, purchase detail data, then a determination of the categorization of the proposed transaction is performed based for the $i^{th}$ item described by the purchase detail data. For each $i^{th}$ item described by the purchase detail data, the exemplary embodiment attempts to retrieve a budget category from budget category database 114.

Once the proposed transaction has been categorized for the $i^{th}$ item (S515), a determination is made to determine whether the value of the $i^{th}$ item (described by the transaction data) exceeds the funds available (stored in the funds available variable) (S516). If sufficient funds are not available to sufficiently pay for the $i^{th}$ item, then operations S514-S528 are performed for the next item in the proposed transaction (the "$i^{th}$+1" item) (S518).

However, if sufficient funds are available (S516), engine 224 determines whether the value of the $i^{th}$ item exceeds the funds available for that category of expenditures in the budget 312 (FIG. 3) for the card holder 108 (S520). Engine 224 initially scans the budget 312 retrieved during performance of operation S506 to ascertain whether the category into which the $i^{th}$ item has been categorized exists in budget 312. This initial determination is made by scanning budget category 310 for each budgetary item 308. If one or more budgetary items 308 are located which have a budget category 310 which is the same as the category of the $i^{th}$ item (i.e., the $i^{th}$ item falls into, relates, or appertains to the same category as one of the budgetary items 308 in budget 312), then a comparison is made to determine whether the funds remaining (column 318) for those budgetary items 308 is sufficient to satisfy the purchase price of the $i^{th}$ item. In the exemplary embodiment, if more than one budgetary item 308 is identified which have a budget category 310 which is the same as the category for the $i^{th}$ item, the comparison between the value (i.e., purchase price) of the $i^{th}$ item is compared to the cumulative total of the amount remaining (column 318) for each of the budgetary items 308 identified. If no budgetary item 308 is identified by engine 224 which has the same budget category 310 as the $i^{th}$ item, then the $i^{th}$ item is authorized for purchase.

If the value of the $i^{th}$ item exceeds that of the funds remaining for the budgetary item(s) 308 identified, then the purchase of the $i^{th}$ item is rejected (S522) and operations S514-S528 are repeated for the next ("$i^{th}$+1") item (S518).

However, if the value of the $i^{th}$ item does not exceed that of the funds remaining for the budgetary item(s) 308 identified, then the funds available variable for further purchases is reduced by the value of the $i^{th}$ item (S524); the purchase of the $i^{th}$ item is authorized; the funds remaining (column 318) for the budgetary item(s) 308 identified is also reduced by the value of the $i^{th}$ item; and the resulting modified budget 310 is also saved or stored in budget database 116 (S526). Operations S514-S528 are then repeated for the next ("$i^{th}$+1") item (S518), if there exists a next item in the proposed transaction (S528).

As a consequence of operations S520 and S522 in particular, budgetary restrictions placed on a card 108*a* can be enforced at the time of an attempted purchase of items (i.e., goods or services).

Once it has been determined whether to authorize or reject each of the items in the proposed transaction, the total (i.e., aggregate) value of the authorized items is calculated and this amount is deducted from the funds available from account 306 (S530). Merchant 106 is then notified (by electronic transmission in the exemplary embodiment) of the items which have been authorized and those that have been rejected (S532).

Operations 500 enable a card holder 108 or a third party to enforce budgetary decisions (which are often made after much thought and deliberation) at a time of purchase. Consequently, a card holder 108 is provided with a mechanism which may assist the card holder in foregoing items purchased on the "spur of the moment" or without much thought thus potentially saving the card holder from future regret or consternation.

Figure 6:
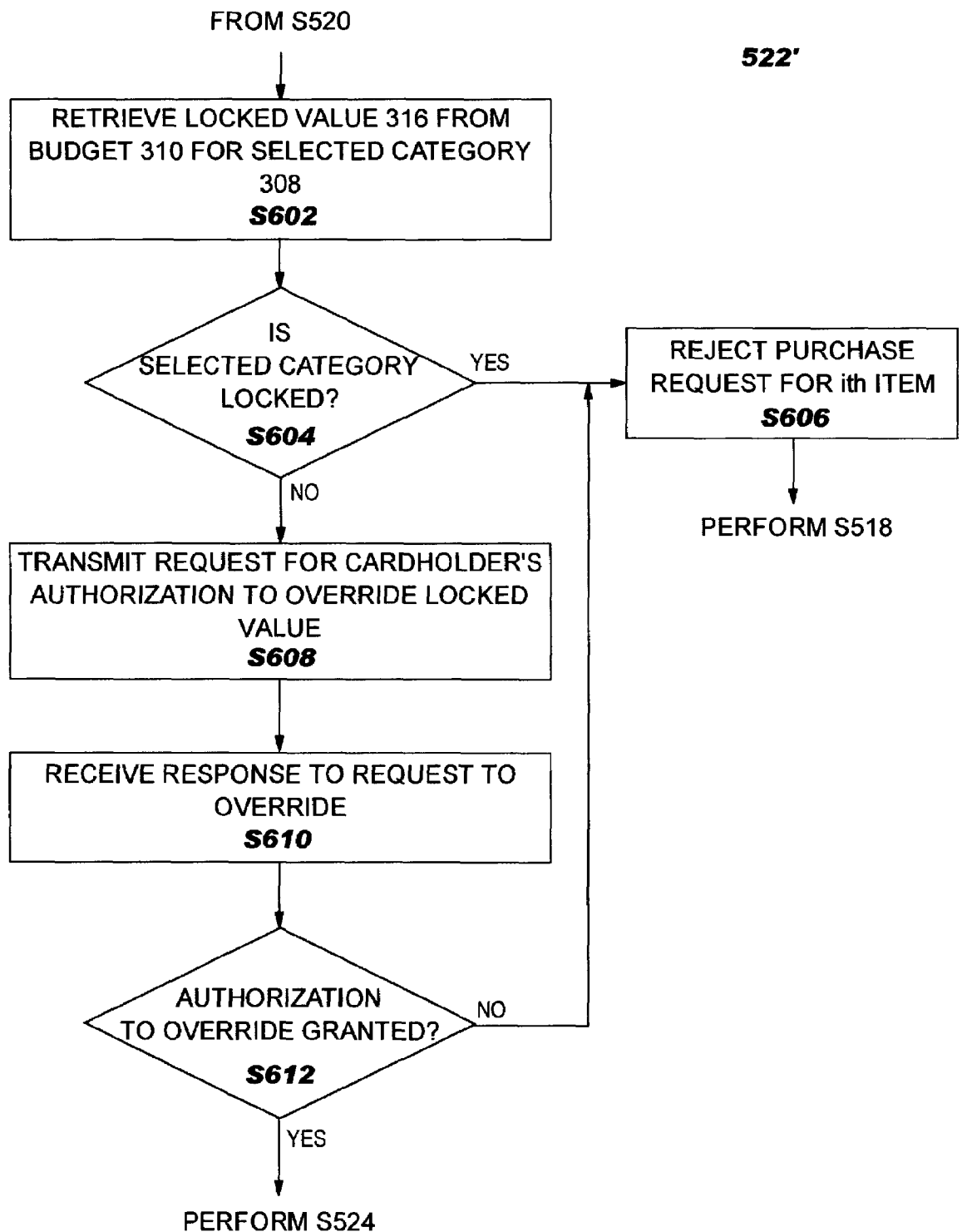
FIG. 6 is a flowchart exemplary of an alternative set of operations which replace a portion of the operations illustrated in FIG. 5.

An alternative or enhancement to operation S522 (an operation performed to reject the purchase of an $i^{th}$ item due to a budgetary restriction) is illustrated in flowchart form in FIG. 6. If it is determined that a budgetary restriction (from one or more budgetary items 308) exists which, if enforced, will result in the rejection of the purchase of the $i^{th}$ item (S520) (a "potential rejection"), alternate operation S522 (designated operation S522') may be performed. Once a potential rejection is identified, engine 224 will determine whether the budgetary item(s) 308 is locked (S602-S604). If the budgetary item(s) is locked, then the purchase of the $i^{th}$ item is rejected (S606). However, if one or more of the budgetary items 308 identified are not locked and the unlocked budgetary item(s) have sufficient funds remaining (column 318) to satisfy the purchase of the $i^{th}$ item, engine 224 transmits a request for authorization from card holder 108 to override the budgetary restriction (S608). Authorization for the override can be granted or denied in S612. In the exemplary embodiment, this request for override authorization is transmitted electronically over network 104 to merchant 106. A response to the override authorization may then be granted or withheld by card holder 108 transmitting their decision to account holder 102 (S610). A card holder 108 may input a PIN (or other identification) and/or some other indication into a card reader to indicate whether override authorization is granted. If override authorization is granted by the card holder 108, operation S524 and subsequent operations (FIG. 5) are performed (i.e., the purchase of the $i^{th}$ item is authorized). Otherwise, the purchase of the $i^{th}$ item is rejected and operation S606 is performed.

As will be appreciated by those of ordinary skill in the art, the embodiments of the invention described herein provide methods, means and mechanisms to set budgetary restrictions on the use of a card and enforce those same budgetary restrictions at the time of the purchase of goods and/or services.

In one alternative embodiment of the present invention, the purchase detail data transmitted by the merchant to the account holder describes the categories of the items of the proposed transaction (instead, or in place, of data describing the items themselves) understandable by the account holder. In this embodiment, the categorization of each individual item in a proposed transaction would not have to be categorized by the account holder as this information would be contained in the purchase detail data.

In a further alternative, budgetary items 308 (FIG. 3) could be alternatively or additionally be categorized by merchant name or other identifier in place of, or in addition to, a budget category. In this alternative embodiment, a further data field column would either replace or be used in addition to budget category 310.

In a further alternative, a proposed transaction may be categorized into one of the budget categories found in a budget associated with the account of the card holder. That is, rather than categorize a proposed transaction into a category based on all categories of goods and services maintained by the account holder, or based on an association between a merchant identifier and one or more categories, the categorization can be performed using only the set of categories found in a budget of a card holder. In this instance, a budgetary item will always be located within a card holder's budget that may have an impact on whether a proposed transaction (or portion thereof) will be authorized or rejected.

While one (or more) embodiment(s) of this invention has been illustrated in the accompanying drawings and described above, it will be evident to those skilled in the art that changes and modifications may be made therein without departing from the essence of this invention. All such modifications or variations are believed to be within the sphere and scope of the invention as defined by the claims appended hereto. Other modifications will be apparent to those skilled in the art and, therefore, the invention is defined in the claims.

What is claimed is:

1. A computer implemented method for authorizing or rejecting a financial transaction using a card, said card associated with an account maintained by an account holder, said financial transaction between a merchant and a card holder holding said card and authorized by the account holder, said method comprising:
   retrieving a budget associated with the card when the card holder attempts to conduct a financial transaction using a processor of a computing device;
   characterizing the financial transaction into one of a plurality of budget categories of the budget that is retrieved using the processor of the computing device;
   rejecting said financial transaction when funds available for the one of the plurality of budget categories are insufficient to cover said financial transaction using the processor of the computing device;
   transmitting override query data to the merchant to query the card holder as to whether to override the rejection using the processor of the computing device;
   receiving override data associated with the card holder's personal identification number (PIN) in response to the override query data using the processor of the computing device; and
   authorizing the financial transaction based upon the override data using the processor of the computing device,
   wherein the account holder comprises a financial institution associated with the card, and the account holder performs the retrieving, the characterizing, the rejecting, the transmitting, the receiving, and the authorizing, and the plurality of budget categories are associated with budgetary items and at least one of said budgetary items comprises a lock value indicating whether a restriction imposed by said at least one budgetary item can be overridden.

2. The method of claim 1 further comprising:
   when a budgetary item of a the budget associated with said card does not restrict use of funds available in said account or when the budget associated with said card is not available:
   authorizing said financial transaction when funds available in said account are sufficient to cover said financial transaction; and
   rejecting said financial transaction when said funds available in said account are insufficient to cover said financial transaction.

3. The method of claim 1, further comprising:
   receiving transaction data from said merchant describing said financial transaction.

4. The method of claim 3 wherein said categorizing comprises:
   categorizing said financial transaction utilizing a database of budget categories.

5. The method of claim 1, wherein said account holder receives from the merchant purchase detail data describing one or more items included in said financial transaction and wherein said categorizing comprises:
   for each item of said one or more items included in said financial transaction data:
   categorizing said each item using said purchase detail data received.

6. The method of claim 1, further comprising:
   storing budget data comprising one or more budgetary items for said account received from a user restricting the use of funds of said account, wherein the user is different from the card holder.

7. The method of claim 1 wherein each of said budgetary item comprises at least one of: a category of expenses, a category of items, and a merchant identifier.

8. The method of claim 7 wherein at least one of said budgetary items further comprises a time period.

9. The method of claim 1, further comprising:
   maintaining account records relating to the budget associated with the card; and
   providing a web site through which the card holder may access and then create or modify budgetary items associated with the budget associated with the card.

10. The method of claim 9, wherein the account holder performs the maintaining and the providing.

11. A computer implemented method for authorizing a financial transaction using a card, said card associated with an account maintained by an account holder and having a sum of funds available, said financial transaction being between a merchant and a card holder using said card, said method comprising:
    maintaining account records relating to a budget associated with the card using a processor of a computing device;
    providing a web site through which the card holder may access and then create or modify budgetary items associated with the budget associated with the card using the processor of the computing device;
    retrieving the budget associated with the card when the card holder attempts to conduct the financial transaction using the processor of the computing device;
    characterizing the financial transaction into one of a plurality of budget categories of the budget that is retrieved using the processor of the computing device;
    determining funds available for a budgetary item after the characterizing and when said financial transaction appertains to said budgetary item using the processor of the computing device;
    when both said funds available for said budgetary item and said sum of funds available are sufficient to satisfy a value of said financial transaction, authorizing said financial transaction using the processor of the computing device;
    when said funds available for said budgetary item are not sufficient to satisfy the value of said financial transaction and said sum of finds available are sufficient to satisfy the value of said financial transaction, authorizing said financial transaction when override authorization is received using the processor of the computing device; and
    modifying the budget based upon the authorized transaction using the processor of the computing device, wherein the account holder performs at least the retrieving, the characterizing, the determining, and the modifying, and the override authorization is received as a result of the card holder entering a personal identification number (PIN) at the merchant's card reader.

12. The method of claim 11 wherein said plurality of budget categories are associated with budgetary items, each comprising a lock value indicating whether said budgetary item can be overridden.

13. The method of claim 11 further comprising: receiving transaction data describing financial data.

14. The method of claim 11 wherein said categorizing comprises at least one of:

retrieving from a database information associated with a merchant described by said financial transaction; and retrieving from a database information associated with an item described by said financial transaction, wherein said item describes a good and/or service.

15. A computer implemented method for enforcing a budget on the use of a card for a financial transaction, said card associated with an account maintained by an account holder, said account comprising a balance describing funds available in said account, said financial transaction being between a merchant and a card holder using said card, said method comprising:

maintaining account records relating to a budget associated with the card using a processor of a computing device;

providing a web site through which the card holder may access and then create or modify budgetary items associated with the budget associated with the card using the processor of the computing device;

storing the budget comprising budgetary items, each said budgetary items associating a category with a sum of funds available for purchases appertaining to said category using the processor of the computing device;

using said budget when determining whether to authorize a financial transaction using said card;

retrieving the budget associated with the card when a card holder attempts to conduct the financial transaction using the processor of the computing device;

characterizing the financial transaction into one of said categories of the budget that is retrieved using the processor of the computing device;

receiving a request for authorization for said financial transaction using the processor of the computing device, wherein the account holder comprises a financial institution that issued the card or that maintains an account associated with the card, and the account holder performs the maintaining, the providing, the retrieving and the characterizing, and the request is received from a third party.

16. A method for authorization of a financial transaction involving the use of a card having budgetary restrictions, said method comprising:

storing, in an account with an account holder, a budget comprising budget categories using a processor of a computing device;

receiving a transmission to the account holder maintaining the account associated with said card describing: a value of said financial transaction, said card, and a plurality of items included in said financial transaction, each of said plurality of items comprising one of a good and a service;

characterizing said financial transaction into one of the budget categories of the budget using the processor of the computing device; and transmitting authorization or rejection of said financial transaction based on the characterizing using the processor of the computing device, wherein the account holder is a financial institution associated with the card and the account holder performs the characterizing and the transmitting in order to enforce the budgetary restrictions on the use of the card.

17. A computer readable storage media containing data and computer executable instructions which, when executed on a computer system of an account holder, causes the computer system to:

retrieve a budget associated with a card when a card holder attempts to conduct a financial transaction;

characterize the financial transaction into one of a plurality of budget categories of the budget that is retrieved;

authorize said financial transaction when funds available in one of the plurality of budget categories are sufficient to cover said financial transaction and when the financial transaction is characterized into one of the plurality of budget categories; and reject said financial transaction when funds available in the one of the plurality of budget categories are insufficient to cover said financial transaction, wherein each of said plurality of budget categories is associated with a respective budget amount and a balance remaining.

18. A method for authorizing or rejecting a financial transaction using a card, said card associated with an account maintained by an account holder, said financial transaction between a merchant and a card holder, said method comprising:

obtaining budget information comprising a plurality of budgetary items from at least one of the card holder and a third party;

storing the budget information using a processor of a computing device;

receiving data associated with said financial transaction using the processor of the computing device;

comparing the data to the budget information using the processor of the computing device; and authorizing in full, authorizing in part, or rejecting of said financial transaction based on the comparing using the processor of the computing device, wherein each of the plurality of budgetary items is associated with a respective budget category, budget amount, and balance remaining, wherein the account holder comprises a financial institution associated with the card, and the account holder performs: (i) the receiving; (ii) the comparing; and (iii) the authorizing in full, authorizing in part, or rejecting.

* * * * *